US010572400B2

(12) United States Patent
Finkelstein et al.

(10) Patent No.: US 10,572,400 B2
(45) Date of Patent: Feb. 25, 2020

(54) SHARED PROCESSING OF A PACKET FLOW BY MULTIPLE CORES

(71) Applicant: Mellanox Technologies, Ltd., Yokneam (IL)

(72) Inventors: Dotan Finkelstein, Nes Ziona (IL); Lior Narkis, Petach Tikva (IL); Dror Bohrer, Nesher (IL); Roee Moyal, Yokneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 134 days.

(21) Appl. No.: 15/623,426

(22) Filed: Jun. 15, 2017

(65) Prior Publication Data

US 2018/0365176 A1    Dec. 20, 2018

(51) Int. Cl.
*G06F 13/16* (2006.01)
*G06F 13/36* (2006.01)
*H04L 12/801* (2013.01)

(52) U.S. Cl.
CPC .......... *G06F 13/1642* (2013.01); *G06F 13/36* (2013.01); *H04L 47/34* (2013.01)

(58) Field of Classification Search
CPC ....... G06F 13/1642; G06F 13/36; H04L 47/34
USPC ................ 710/6, 9, 52, 54, 56, 112
See application file for complete search history.

(56) References Cited

U.S. PATENT DOCUMENTS

| 4,543,630 | A | 9/1985 | Neches |
| 5,826,081 | A | 10/1998 | Zolnowsky |
| 5,881,315 | A | 3/1999 | Cohen |
| 5,938,736 | A | 8/1999 | Muller et al. |
| 5,991,302 | A | 11/1999 | Berl et al. |
| 6,182,120 | B1 | 1/2001 | Beaulieu et al. |
| 6,195,739 | B1 | 2/2001 | Wright et al. |
| 6,229,813 | B1 * | 5/2001 | Buchko ................. H04J 3/1682 370/235 |
| 6,338,078 | B1 | 1/2002 | Chang et al. |
| 6,351,454 | B1 * | 2/2002 | Crocker .................. H04L 45/00 370/235 |
| 6,359,886 | B1 | 3/2002 | Ujihara |

(Continued)

OTHER PUBLICATIONS

Batz et al., "Packet Resequencing Algorithm with Priority Support", IBM Technical Disclosure Bulletin, vol. 36, Issue 12, pp. 77-80, Dec. 1, 1993.

*Primary Examiner* — Farley Abad
*Assistant Examiner* — Henry W Yu
(74) *Attorney, Agent, or Firm* — Kligler & Associates Patent Attorneys Ltd (57) ABSTRACT

A packet processing device CPU, including multiple processing cores. A NIC, which is coupled to the CPU, includes at least one network port, receives a flow of incoming data packets in a sequential order from a packet communication network, and receive logic, which delivers the incoming data packets in the flow to a designated group of the cores for processing by the cores in the group, while distributing the incoming data packets to the cores in alternation among the cores in the group. In response to the incoming data packets, the cores in the group generate corresponding outgoing data packets and queue the outgoing data packets for transmission by the NIC in the sequential order of the incoming data packets. Transmit logic in the NIC transmits the outgoing data packets to the network in the sequential order via the at least one network port.

19 Claims, 4 Drawing Sheets

(56) References Cited

U.S. PATENT DOCUMENTS

| | | | | |
|---|---|---|---|---|
| 6,631,422 | B1 | 10/2003 | Althaus et al. | |
| 7,437,521 | B1* | 10/2008 | Scott | G06F 9/30087 |
| | | | | 711/151 |
| 7,620,722 | B1* | 11/2009 | Ruparel | H04M 3/5191 |
| | | | | 709/224 |
| 7,664,823 | B1* | 2/2010 | Wakerly | G06F 15/163 |
| | | | | 709/211 |
| 8,234,653 | B1* | 7/2012 | Carney | H04L 67/1002 |
| | | | | 370/389 |
| 8,588,242 | B1* | 11/2013 | Izenberg | H04L 47/6225 |
| | | | | 370/235 |
| 8,831,025 | B2* | 9/2014 | Finney | H04L 49/00 |
| | | | | 370/412 |
| 2004/0128401 | A1* | 7/2004 | Fallon | H04L 29/06 |
| | | | | 709/250 |
| 2007/0195761 | A1* | 8/2007 | Tatar | H04L 49/1546 |
| | | | | 370/389 |
| 2014/0192815 | A1* | 7/2014 | Shumsky | H04L 47/6215 |
| | | | | 370/394 |
| 2014/0245308 | A1* | 8/2014 | Moerman | G06F 9/4843 |
| | | | | 718/102 |
| 2015/0286594 | A1* | 10/2015 | Degani | G06F 13/24 |
| | | | | 710/261 |
| 2016/0182380 | A1* | 6/2016 | Mehra | H04L 47/125 |
| 2018/0285151 | A1* | 10/2018 | Wang | G06F 9/4881 |

\* cited by examiner

SHARED PROCESSING OF A PACKET FLOW BY MULTIPLE CORES

FIELD OF THE INVENTION

The present invention relates generally to computer network communications, and particularly to devices and methods for interfacing between host processors and a network.

BACKGROUND

A network interface controller (NIC) is a device that manages and transfers communications between a host computer (referred to alternatively simply as a "host") and a network, such as a local area network or switch fabric. The NIC directs packets from the network to their destination in the computer, for example by placing the packets in a buffer of a destination application in the computer memory, and directs outgoing packets from the computer to the network.

SUMMARY

Embodiments of the present invention that are described hereinbelow provide efficient devices and methods for processing flows of packets received from a network.

There is therefore provided, in accordance with an embodiment of the invention, a packet processing device, including a central processing unit (CPU), including multiple processing cores. A network interface controller (NIC) is coupled to the CPU and includes at least one network port, which is configured to receive a flow of incoming data packets in a sequential order from a packet communication network, and receive logic, which is configured to deliver the incoming data packets in the flow to a designated group of the cores for processing by the cores in the group, while distributing the incoming data packets to the cores in alternation among the cores in the group. In response to the incoming data packets, the cores in the group generate corresponding outgoing data packets and queue the outgoing data packets for transmission by the NIC in the sequential order of the incoming data packets. Transmit logic is configured to transmit the outgoing data packets to the network in the sequential order via the at least one network port.

In some embodiments, the device includes a memory, wherein the receive logic is configured to write data from the incoming data packets to the memory and to notify the cores that the data have been written to the memory by writing completion reports to a completion queue, which is shared among the cores in the group. In a disclosed embodiment, the cores in the group are configured to read the completion reports and in response to the completion reports, to read and process the data so as to generate the outgoing data packets, wherein each of the cores in the group reads a respective subset of the completion reports from the shared completion queue, wherein the respective subset is selected in accordance with the alternation of distributing the incoming data packets.

Additionally or alternatively, the cores are configured to queue the outgoing data packets by posting respective work items in a send queue, which is shared among the cores in the group, and the transmit logic is configured to read the work items from the send queue and to transmit the outgoing data packets responsively to the work items. In some embodiments, the cores in the group post the work items in the send queue in the sequential order in accordance with the alternation of distributing the incoming data packets.

In the disclosed embodiments, the cores in the group are configured, upon posting the respective work items, to advance respective producer indexes, corresponding to positions of the work items in the send queue, by an increment equal to a number of the cores in the group, and the transmit logic is configured to find a minimal producer index among the respective producer indexes, and to transmit the outgoing data packets that are indicated by the work items that have been posted in the work queue in respective positions preceding the minimal producer index. In one embodiment, the transmit logic is configured, upon reading the work items, to advance a consumer index to indicate the last work item that was executed by the transmit logic, and to read further work items from the send queue only when the minimal producer index is greater than the consumer index.

Typically, each core in the group is configured to process the incoming data packets that are respectively distributed to the core concurrently with and independently of processing of the other incoming data packets by the other cores in the group. Additionally or alternatively, the NIC is configured to receive the incoming data packets in multiple different flows from the packet communication network, and to deliver the different flows for processing to respective groups of the cores.

In a disclosed embodiments, the CPU and the NIC are embodied together in a single integrated circuit chip.

There is also provided, in accordance with an embodiment of the invention, a method for processing, which includes receiving in a network interface controller (NIC) a flow of incoming data packets in a sequential order from a packet communication network. The incoming data packets in the flow are delivered to a designated group of cores of a central processing unit (CPU) for processing by the cores in the group, while distributing the incoming data packets to the cores in alternation among the cores in the group. The cores in the group generate, in response to the incoming data packets, corresponding outgoing data packets and queue the outgoing data packets for transmission by the NIC in the sequential order of the incoming data packets. The NIC transmits the outgoing data packets to the network in the sequential order.

The present invention will be more fully understood from the following detailed description of the embodiments thereof, taken together with the drawings in which:

DETAILED DESCRIPTION OF EMBODIMENTS

In many packet communication applications, a NIC receives incoming flows of data packets from a packet communication network, delivers the packets to a central processing unit (CPU) for processing, and after processing transmits corresponding flows of outgoing data packets back to the network. A "flow" in the present context is a sequence of packets transmitted through the network from a particular source to a particular destination. On Internet Protocol (IP) networks, for example, packet flows can be identified by the packet 5-tuple (source and destination IP addresses and ports, along with the transport protocol). Alternatively, any other suitable flow identifier may be used.

In some applications, it is critical that the order of the data packets in the outgoing flow matches the sequential order in which the corresponding incoming data packets were received. When the CPU comprises multiple processing cores, meeting this requirement often dictates that the NIC direct all packets in any given flow to the same core. Otherwise, if one of the cores handling the flow lags in its processing tasks, for example due to a particularly heavy processing load, another core that is less busy may complete processing of an incoming packet and queue the corresponding outgoing packet for transmission out of order, ahead of an earlier incoming packet that is still being processed by the busier core.

The need to direct all packets in a given flow to the same core, however, limits the ability of the NIC to balance processing load among the cores and can give rise to bottlenecks in handling of heavy flows by the CPU.

Embodiments of the present invention that are described herein address this problem by providing a packet processing device, comprising a NIC and multi-core CPU, in which the NIC can distribute a flow of incoming data packets among a group of two or more cores in alternation, and be assured that the outgoing data packets will be queued by the cores for transmission in the same sequential order as the corresponding incoming data packets. The size of the group of cores can be chosen to accommodate the needs of the flow, and multiple flows can be handled concurrently in this manner by respective groups of the cores.

The disclosed embodiments maintain the proper packet ordering of the outgoing packets without imposing any requirement that the CPU maintain a shared state among the cores, and thus without the additional processing burden imposed by such a requirement. Rather, each core processes its share of the incoming packets and queues its outgoing packets concurrently with and independently of the processing of the other incoming data packets by the other cores in the group. These benefits are achieved by novel techniques of queue management in cooperation between the NIC and the cores of the CPU, as described in greater detail hereinbelow.

Figure 1:
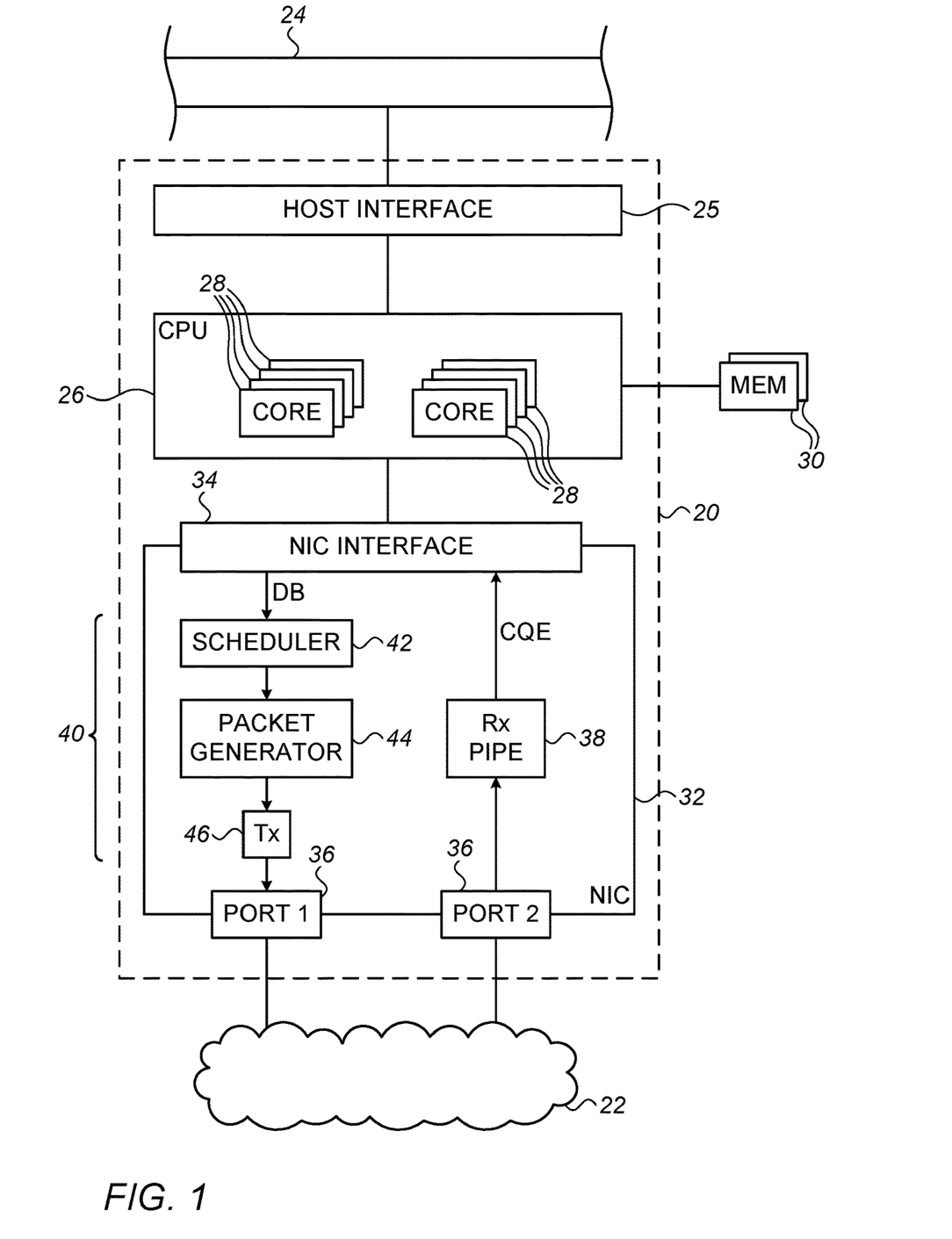
FIG. 1 is a block diagram that schematically illustrates a packet processing device, in accordance with an embodiment of the invention.

FIG. 1 is a block diagram that schematically illustrates a packet processing device 20, in accordance with an embodiment of the invention. In the present embodiment, the components of device 20, including a CPU 26 and a NIC 32, which connects device 20 to a packet network 22, are embodied together in a single integrated circuit chip. In alternative embodiments, CPU 26 and NIC comprise separate components, for example separate chips, which are connected together and configured to carry out the packet processing functions that are described herein.

In some embodiments, device 20 is installed in a server or network appliance, often together with other such packet processing devices. For this purpose, device 20 comprises a host interface 25, which connects device 20 to a host bus 24, such as a PCIe® bus of the server or appliance. Host interface 25 enables the host CPU of the server (not shown), for example, to download software and operating instructions to device 20 and to monitor the performance of the device.

CPU 26 comprises multiple processing cores 28, which are configured particularly to run packet processing applications, for example packet routing and filtering applications. Alternatively or additionally, CPU 26 may run other sorts of application programs. Typically, cores are interconnected by buses and have on-chip cache memories (not shown). In addition, CPU 26 has an interface to one or more external memory chips 30, comprising any suitable sort of volatile RAM or non-volatile memory that is known in the art.

NIC 32 is connected to network 22 by a network interface in the form of one or more network ports 36. A NIC interface 34 connects NIC 32 to CPU 26 and enables the NIC to write data to memory 30 and pass notifications to cores 28, as well as to receive data and instructions from cores 28. NIC 32 comprises hardware logic, coupled between interface 34 and ports 36, for processing incoming data packets received from network 22 and processing outgoing data packets for transmission to the network.

Specifically, the processing logic in NIC 32 includes a receive (Rx) pipe 38 and a transmit pipe 40. Receive pipe 38 processes incoming data packets received by ports 36 from network 22 and delivers the incoming data packets, via NIC interface 34, to cores 28 for processing. Depending on instructions issued to NIC 32 by CPU 26, each incoming flow is assigned for processing to a designated core 28 or group of cores 28. Multiple different incoming flows may be assigned in this manner to different, respective cores or groups of cores. As explained in further detail hereinbelow, each flow is associated with a queue pair (QP), which comprises a receive queue (RQ) for incoming packets and a send queue (SQ) for outgoing packets. Typically, receive pipe 38 writes data from the incoming data packets to memory 30 and then notifies cores 28 that the data have been written to the memory by writing completion reports, referred to as completion queue elements (CQEs), to a completion queue (CQ). When a flow is assigned to a group of cores 28, the corresponding CQ is shared among the cores in the group.

When a given flow is assigned to a group of cores 28, receive pipe 38 distributes the incoming data packets to the cores in alternation among the cores in the group. For instance, the packets may be distributed among a group of n cores in a round-robin, so that each core receives one of every n packets. An example of this sort of alternation scheme, with n=2, is described below with reference to FIG. 2. Alternatively, other alternation schemes, including both regular and irregular patterns of alternation, may be used depending on system configuration and application requirements. For example, each core can receive and handle bursts of two or more consecutive packets in the sequence.

In response to the flow of incoming data packets, cores 28 in the designated group generate corresponding outgoing data packets and queue the outgoing data packets for transmission by transmit pipe 40 in NIC 32. Cores 28 queue the outgoing data packets for transmission—in the same sequential order as the incoming data packets—by posting respective work items, referred to as work queue elements (WQEs), in the appropriate send queue, which is shared among the cores in the group. Cores 28 process the incoming packets concurrently and independently of one another, and write their respective WQEs to the send queue as they complete their packet processing tasks. Notwithstanding possible variations in processing time among the cores, however, the WQEs are ordered in the send queue in the same sequential order in which the corresponding incoming packets were received by NIC 32. Cores 28 notify transmit pipe 40 when a new WQE has been posted by submitting a notification via NIC interface 34, referred to as "ringing a doorbell" (DB) of the NIC. This process is described in greater detail hereinbelow with reference to FIG. 3.

The doorbell alerts a scheduler 42 in transmit pipe 40 to read the WQEs from the send queue and to decide when to transmit outgoing data packets in response to the WQEs. This scheduling process is described further hereinbelow with reference to FIG. 4. Once a WQE has been scheduled for processing, a packet generator 44 in transmit pipe 40 reads the WQE, along with applicable context information with respect to the QP that is assigned to the flow, and generates the outgoing packet header. A packet transmitter 46 assembles the header and data of each outgoing data packet and transmits the packets via port 36 to network 22, again in the same sequential order as the flow of incoming packets, as dictated by the order of WQEs in the send queue.

Figure 2:
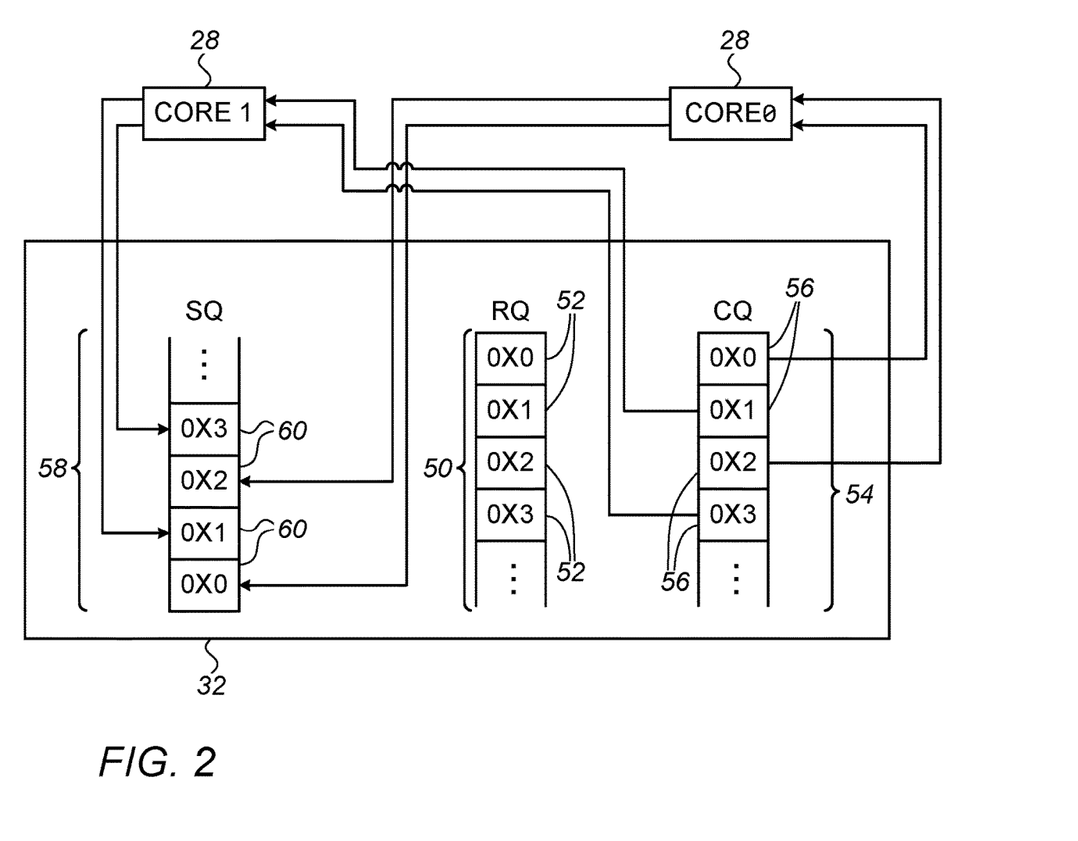
FIG. 2 is a block diagram that schematically illustrates data structures used by the device of FIG. 1 in handling a flow of data packets, in accordance with an embodiment of the invention.

FIG. 2 is a block diagram that schematically illustrates data structures used by device 20 in handling a flow of data packets, in accordance with an embodiment of the invention. In this example, an incoming data flow is distributed by NIC 32 in alternation between two cores 28, labeled CORE0 and CORE1 in FIG. 2. This same sort of scheme and data structures may be used, mutatis mutandis, in distributing a flow for processing among three or more cores, up to the full number of available cores in CPU 26.

NIC driver software running on CPU 26 posts receive WQEs in a receive queue (RQ) 50, indicating buffers in memory 30 to which NIC 32 is to write incoming data packets in a given flow. Upon receiving an incoming packet in the flow, receive pipe 38 reads the next available receive WQE 52 from RQ 50 and writes the packet data to the buffer in memory 30 that is indicated by the WQE. Receive pipe 38 then writes a CQE 56 to a completion queue (CQ) 54. These CQEs are numbered sequentially 0x0, 0x1, 0x2, ..., in the same sequential order as the incoming packets in the flow.

CQ 54 is shared among cores 28 in the group that has been designated to handle this flow, in this case CORE0 and CORE1. Each of these cores is programmed to read a respective subset of the CQEs from the shared CQ, and to process the packet data that receive pipe 38 wrote to the corresponding buffer in memory 30. The subset of CQEs 56 that each core 28 reads is selected in accordance with the alternation of distribution of the incoming data packets for processing by the cores. Thus, in the present example, the even-numbered incoming packets are distributed to CORE0, and the odd-numbered packets to CORE1. Therefore, CORE0 reads and process CQEs 0x0, 0x2, ..., while CORE1 reads and processes CQEs 0x1, 0x3, ....

Cores 28 process their respective alternating shares of the incoming data packets and then queue the corresponding outgoing data packets by posting respective WQEs 60 in a send queue (SQ) 58, which is shared by CORE0 and CORE1. Each WQE contains send instructions and points to the data in memory 30 to be written by transmit pipe 40 to the corresponding outgoing data packet.

Cores 28 write their WQEs 60 to assigned slots in SQ 58 that match the sequential order of the incoming data packets and CQEs 56. For example, the WQE for the outgoing data packet corresponding to the incoming data packet of CQE 0x0 is written to slot 0x0 in SQ 58, and so forth. Thus, CORE0 writes its WQEs to the even-numbered slots, and CORE1 to the odd-numbered slots, so that even if cores 28 may sometimes complete their respective processing of the incoming data packets out of order, the correct order is maintained in SQ 58. Transmit pipe 40 reads WQEs 60 from SQ 58 in queue order and thus transmits the outgoing data packets, responsively to the WQEs, in the proper transmit order. The proper order of posting send WQEs may be maintained, for example, by allocating a separate sub-queue to each core in the group, and configuring scheduler 42 to read the sub-queues in alternation. The sub-queues logically constitute a single send queue, and thus the logical result of this configuration will be the same as is shown in FIG. 2.

Figure 3:
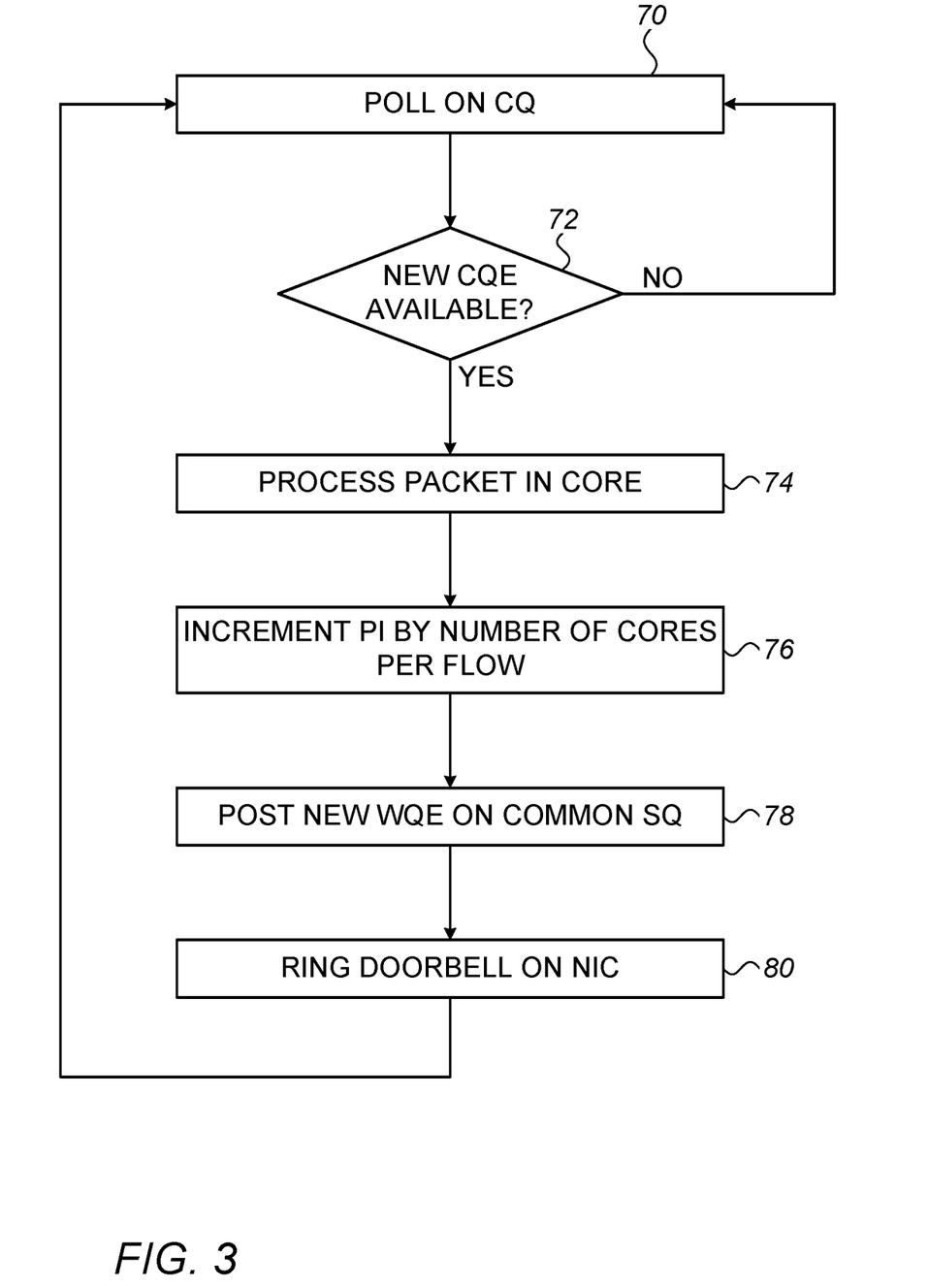
FIG. 3 is a flow chart that schematically illustrates a method for handling of data packets by a processing core, in accordance with an embodiment of the invention.

FIG. 3 is a flow chart that schematically illustrates a method for handling of data packets by one of processing cores 28, in accordance with an embodiment of the invention. This method is carried out by all of the cores in the group that is designated to handle a given incoming flow. For the sake of simplicity and clarity, it will be described here with reference to CORE0, as shown in FIG. 2.

Core 28 polls CQ 54 periodically to determine whether a new CQE 56 has been posted for the attention of the core, at a polling step 70. In the present example, CORE0 will poll for new CQEs in the even-numbered slots of CQ 54. If no new CQE is found, at a CQE evaluation step 72, the core returns to step 70 and continues polling. Upon encountering a new CQE, core 28 reads the packet data that was saved by receive pipe 38 in the buffer in memory 30 indicated by the corresponding receive WQE 52, and processes the data in accordance with the appropriate software instructions at a packet processing step 74. The core then saves the processed data in a buffer, to be accessed by transmit pipe 40 in generating the corresponding outgoing packet.

Cores 28 maintain respective producer indexes, corresponding to positions of WQEs 60 in send queue 58. These producer indexes are typically held as part of the QP context information, in a memory that is accessible to both cores 28 and NIC 32. To indicate to scheduler 42 that a new packet has been prepared for transmission, each core advances its producer index (PI) by an increment equal to the number of the cores in the group that has been assigned to handle the flow in question, at a PI incrementing step 76. In the present example, CORE0 and CORE1 will each advance the respective PI by two each time a new outgoing packet is prepared for transmission. (The number of cores in the group, and hence the size of the increment to PI for each new WQE, can be indicated to cores 28 and NIC 32 by scheduling context information that is stored in memory for the QP.) In conjunction with advancing the producer index, core 28 posts the corresponding WQE 60 in SQ 58, at a WQE posting step 78. The core then submits a doorbell message to NIC 32 in order to inform scheduler 42 that a new WQE is ready for processing, at a doorbell ringing step 80.

Figure 4:
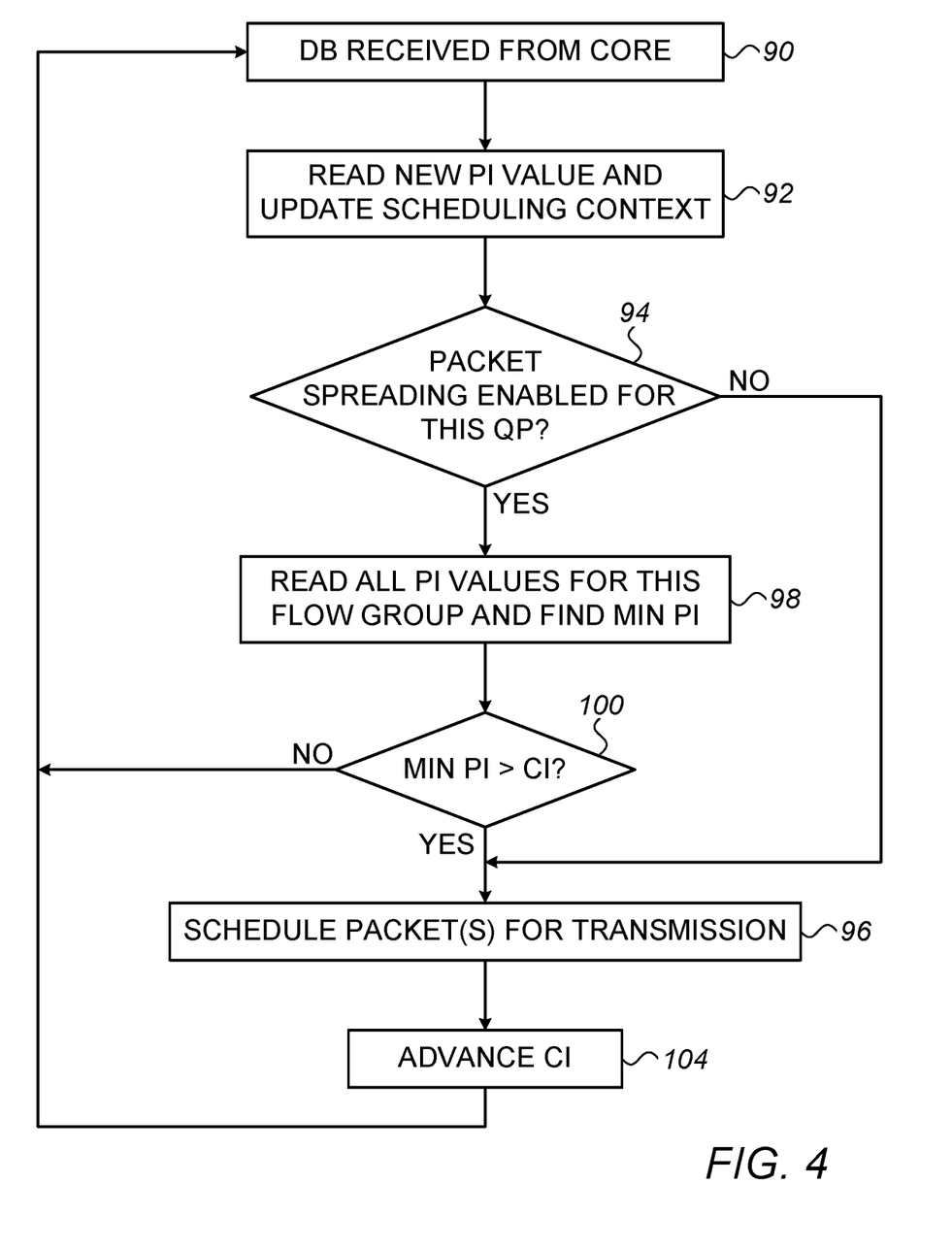
FIG. 4 is a flow chart that schematically illustrates a method for transmission of packets by a NIC, in accordance with an embodiment of the invention.

FIG. 4 is a flow chart that schematically illustrates a method for transmission of packets by NIC 32, in accordance with an embodiment of the invention. This method is initiated when scheduler 42 receives a doorbell message from any one of cores 28, at a doorbell reception value 90. Scheduler 42 reads the new PI value from the QP context in memory and updates its scheduling context with this information, at a PI reading step 92. The scheduler checks the context information to ascertain whether packet spreading is in effect for this QP, i.e., whether the corresponding flow has been distributed among multiple cores 28, at a context checking step 94. If not, scheduler 42 schedules the WQE indicated by the PI value for immediate execution, at a packet scheduling step 96 (since in this case there is no need for special precautions to ensure that the outgoing packets in the flow are transmitted in the proper order).

When scheduler 42 finds at step 94 that packet spreading is enabled for the present QP, the scheduler reads the PIs of all the cores in the designated group, at a PI reading step 98. Scheduler evaluates the PIs to find the minimal PI value in the group. The logical flow described above guarantees that all WQEs 60 in SQ 58 in positions preceding this minimal PI value are ready for execution in the proper order, without any unfilled slots at earlier positions in SQ 58.

To keep track of which WQEs it has read and executed, scheduler 42 maintains a consumer index (CI), which indicates the last WQE 60 that was executed by transmit pipe 40. Scheduler 42 compares the minimal PI value found at step 98 to the current CI value, at an index comparison step 100. If the minimal PI value is not greater than the current CI value, scheduler 42 returns to step 90 to await the next doorbell.

When the minimal PI value is greater than CI, it indicates to scheduler 42 that there are new WQEs 60 in this SQ 58 that are waiting for execution. In this case, scheduler 42 will instruct packet generator 44, at step 96, to generate and transmit the outgoing data packets that are indicated by all of the WQEs that have been posted in SQ 58 in respective positions preceding the minimal PI value and have not yet been executed. Scheduler 42 then advances the CI value to point to the last executed WQE, at a CI incrementing step 104, and returns to step 90 to await the next doorbell.

Although the embodiments described above relate, for the sake of clarity and concreteness, to a particular architecture of device 20 and certain specific processing flows within the device, alternative architectures and applications of the principles of the present invention will be apparent to those skilled in the art after reading the above description and are considered to be within the scope of the present invention.

Furthermore, the principles of the present invention may be applied in handling other sorts of processing tasks in the proper order while using resources of multiple cores concurrently. For example, assume that there are N worker threads running on the cores of a CPU and a vector of tasks T to be executed. For a task T[i] to execute, all worker threads must first finish the appropriate preparations; and all T[j] with j<i must be executed before T[i] can execute. Each worker thread performs all possible preparations for pending tasks to the extent that they are not blocked by unexecuted tasks. When a thread finishes its preparation for a given task, it increments its producer index in the manner described above. A given task T[i] will be ready for execution when all of the worker threads have completed the preparations required for this task. The task can thus be launched once all of the producer indexes have been incremented to values that are equal to or greater than i. Therefore, when the minimum of the producer indexes is equal to or greater than i, task T[i] can be scheduled for execution, as illustrated above in the context of packet transmission tasks in device 20.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A packet processing device, comprising:
a memory;
a central processing unit (CPU), comprising multiple processing cores, configured to retrieve incoming data packets from the memory and to generate corresponding outgoing data packets in the memory; and
a network interface controller (NIC), which is coupled to the CPU and comprises:
at least one network port, which is configured to receive the incoming data packets in a sequential order from a packet communication network;
receive logic, which is configured to deliver the incoming data packets to the memory; and
transmit logic, which is configured to transmit the outgoing data packets to the network via the at least one network port,
wherein a designated group of the cores is assigned to process a specific flow of the incoming data packets, wherein each core in the designated group is configured to read work elements from a respective subset of positions in a completion queue of the specific flow and to process the corresponding incoming data packets of the work elements read from the respective subset of positions, wherein the respective subset of positions is assigned to the core in accordance with a distribution scheme of the incoming data packets between the cores of the group, and
wherein the cores are configured to post work items corresponding to outgoing data packets they generate in respective subsets of slots of a send queue corresponding to the flow, wherein the slots are assigned to the designated group of the cores in accordance with the distribution scheme.

2. The device according to claim 1, wherein the cores in the group are configured, upon posting the respective work items, to advance respective producer indexes, corresponding to positions of the work items in the send queue, and
wherein the transmit logic of the NIC is configured to find a minimal producer index among the respective producer indexes, and to transmit the outgoing data packets that are indicated by the work items that have been posted in the work queue in respective positions preceding the minimal producer index.

3. The device according to claim 2, wherein the transmit logic is configured, upon reading the work items, to advance a consumer index to indicate the last work item that was executed by the transmit logic, and to read further work items from the send queue only when the minimal producer index is greater than the consumer index.

4. The device according to claim 1, wherein each core in the group is configured to process the incoming data packets that are respectively distributed to the core concurrently with and independently of processing of the other incoming data packets by the other cores in the group.

5. The device according to claim 1, wherein the CPU and the NIC are embodied together in a single integrated circuit chip.

6. The device according to claim 1, wherein in the NIC is configured to receive the incoming data packets in multiple different flows from the packet communication network, and to deliver the different flows for processing to respective groups of the cores.

7. A method for processing, comprising:
receiving in a network interface controller (NIC) a flow of incoming data packets in a sequential order from a packet communication network;
delivering the incoming data packets in the flow to a designated group of cores of a central processing unit (CPU) for processing by the cores in the group, while distributing the incoming data packets to the cores in alternation among the cores in the group, by assigning each core of the group to read completion reports from a respective subset of positions in a completion queue of the flow, in accordance with a distribution scheme of the incoming data packets between the cores of the group;

generating in the cores in the group, in response to the incoming data packets, corresponding outgoing data packets;

queueing the outgoing data packets by the cores in the group for transmission by the NIC in the sequential order of the incoming data packets, by assigning each core of the group to post work items corresponding to outgoing data packets they generate in respective subsets of slots of a send queue corresponding to the flow, wherein the slots are assigned to the cores in accordance with the distribution scheme; and transmitting the outgoing data packets to the network in the sequential order, by the NIC.

8. The method according to claim 7, wherein delivering the incoming data packets comprises writing data from the incoming data packets to a memory and notifying the cores that the data have been written to the memory by writing completion reports to the completion queue.

9. The method according to claim 8, wherein generating the outgoing data packets comprises reading the completion reports and in response to the completion reports, reading and process the data so as to generate the outgoing data packets.

10. The method according to claim 7, wherein transmitting the outgoing data packets comprises reading the work items from the send queue and transmitting the outgoing data packets responsively to the work items.

11. The method according to claim 10, and comprising, upon posting the respective work items by the cores, advancing, by the cores, respective producer indexes, corresponding to positions of the work items in the send queue, and wherein reading the work items comprises finding, by the NIC, a minimal producer index among the respective producer indexes, and transmitting the outgoing data packets comprises executing, by the NIC, the work items that have been posted in the work queue in respective positions preceding the minimal producer index.

12. The method according to claim 11, and comprising, upon reading the work items, advancing a consumer index to indicate the last work item that was executed by the transmit logic, wherein executing the work items comprises reading further work items from the send queue for execution only when the minimal producer index is greater than the consumer index.

13. The method according to claim 7, wherein generating the outgoing data packets comprises processing the incoming data packets that are respectively distributed to each of the cores in the group concurrently with and independently of processing of the other incoming data packets by the other cores in the group.

14. The method according to claim 7, wherein the CPU and the NIC are embodied together in a single integrated circuit chip.

15. The method according to claim 7, wherein receiving the flow comprises receiving multiple different flows in the NIC from the packet communication network, and wherein delivering the incoming data packets comprises delivering the different flows for processing to respective groups of the cores.

16. The method according to claim 7, wherein the distribution scheme comprises a round-robin alternation between the cores.

17. The method according to claim 7, wherein the cores ring a doorbell of the NIC after posting each work item to the send queue.

18. The device according to claim 1, wherein the cores are configured to ring a doorbell of the NIC after posting each work item to the send queue.

19. The device according to claim 1, wherein the distribution scheme comprises a round-robin alternation between the cores.

* * * * *